(12) United States Patent
Li et al.

(10) Patent No.: US 11,741,373 B2
(45) Date of Patent: Aug. 29, 2023

(54) TURBULENCE FIELD UPDATE METHOD AND APPARATUS, AND RELATED DEVICE THEREOF

(71) Applicant: INSPUR SUZHOU INTELLIGENT TECHNOLOGY CO., LTD., Jiangsu (CN)

(72) Inventors: Ruyang Li, Jiangsu (CN); Yaqian Zhao, Jiangsu (CN); Rengang Li, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/801,283

(22) PCT Filed: Sep. 23, 2020

(86) PCT No.: PCT/CN2020/117025
§ 371 (c)(1),
(2) Date: Aug. 22, 2022

(87) PCT Pub. No.: WO2021/164250
PCT Pub. Date: Aug. 26, 2021

(65) Prior Publication Data
US 2023/0102815 A1    Mar. 30, 2023

(30) Foreign Application Priority Data
Feb. 21, 2020    (CN) .......................... 202010110908.3

(51) Int. Cl.
*G06N 3/04*    (2023.01)
*G06N 3/092*    (2023.01)
*G06N 3/045*    (2023.01)

(52) U.S. Cl.
CPC ............. *G06N 3/092* (2023.01); *G06N 3/045* (2023.01)

(58) Field of Classification Search
CPC .............................. G06N 3/092; G06N 3/045
See application file for complete search history.

(56) References Cited

U.S. PATENT DOCUMENTS 10,255,807 B1    4/2019   Stenneth
2018/0262291 A1   9/2018   Doster et al.

FOREIGN PATENT DOCUMENTS

CN    106777542 A    5/2017
CN    107742050 A    2/2018
(Continued)

OTHER PUBLICATIONS

Chang et al. "Reynolds-Averaged Turbulence Modeling Using Deep Learning with Local Flow Features—an Empirical Approach", NSE, 2019, pp. 16.*

(Continued)

*Primary Examiner* — Li Wu Chang
(74) *Attorney, Agent, or Firm* — COOPER LEGAL GROUP, LLC

(57) ABSTRACT

Provided are a turbulence field update method, apparatus, and device, and a computer-readable storage medium. The method includes: obtaining sample turbulence data; performing model training by use of the sample turbulence data to obtain a reinforcement learning turbulence model; calculating initial turbulence data of a turbulence field by use of a Reynolds Averaged Navior-Stokes (RANS) equation; processing the initial turbulence data by use of the reinforcement learning turbulence model to obtain a predicted Reynolds stress; and performing calculation on the predicted Reynolds stress by use of the RANS equation to obtain updated turbulence data.

17 Claims, 3 Drawing Sheets

(56) References Cited

FOREIGN PATENT DOCUMENTS

| CN | 108073547 A | 5/2018 |
|---|---|---|
| CN | 108717722 A | 10/2018 |
| CN | 108985929 A | 12/2018 |
| CN | 109165440 A | 1/2019 |
| CN | 110083977 A | 8/2019 |
| CN | 111324993 A | 6/2020 |

OTHER PUBLICATIONS

Rabault et al. "Accelerating deep reinforcement learning strategies of flow control through a multi-environment approach", Physics of Fluids, 2019, pp. 10.*

Wang et al. "Physics-informed machine learning approach for reconstructing Reynolds stress modeling discrepancies based on DNS data", Physical Review Fluids, 2017, pp. 22.*

Kaandorp et al. ("Data-Driven Modelling of the Reynolds Stress Tensor using Random Forests with Invariance", Computers and Fluids (preprint), 2018, pp. 58.*

International Search Report cited in PCT application PCT/CN2020/117025, dated Dec. 21, 2020, 5 pages.

Written Opinion of the International Searching Authority cited in PCT application PCT/CN2020/117025, dated Dec. 21, 2020, 7 pages.

* cited by examiner

TURBULENCE FIELD UPDATE METHOD AND APPARATUS, AND RELATED DEVICE THEREOF

RELATED DEVICE THEREOF

This application claims priority to Chinese Patent Application No. 202010110908.3, filed on Feb. 21, 2020, in China National Intellectual Property Administration and entitled "Turbulence Field Update Method and Apparatus, and Related Device Thereof", the contents of which are hereby incorporated by reference in its entirety.

FIELD

The present application relates to the technical field of reinforcement learning, and particularly to a turbulence field update method, as well as a turbulence field update apparatus and device, and a computer-readable storage medium.

BACKGROUND

Turbulence is ubiquitous in nature and industry. For example, extreme weather in nature, such as sandstorm, typhoon, and tsunami, complex flow environments of large civil airliners and passenger ships, and internal flows of aero-engines involved in independent research and development are all typical turbulences. Turbulence is a complex flow irregular in spatial and temporal distribution, characterized by high nonlinearity, randomness, multi-scale, etc.

In a turbulence field, a Reynolds number of a practical turbulent environment often reaches $Re \sim O(10^{10})$. The problem of highly-nonlinear complex flow with an ultra-high Reynolds number is solved generally by observation with wind tunnel and water tunnel tests and numerical simulation with a Reynolds Averaged Navier-Stokes (RANS) equation. However, due to the limitations of test observation technologies and the constraint of the test cost, numerical simulation with the RANS equation is currently the main turbulence research means.

However, since turbulence models are mostly derived from simple flows, in front of complex problems such as a high-Reynolds-number separated flow, a calculation result of the RANS equation is often deviated greatly from the actual situation, and it is impossible to implement more accurate turbulence field update.

Therefore, how to effectively improve the calculation accuracy and implement more accurate turbulence field update is a problem urgent to be solved by those skilled in the art.

SUMMARY

An objective of the present application is to provide a turbulence field update method. According to the turbulence field update method, the calculation accuracy may be improved effectively, thereby achieving more accurate turbulence field update. Another objective of the present application is to provide a turbulence field update apparatus and device, and a computer-readable storage medium, which also have the above-mentioned beneficial effect.

In order to solve the foregoing technical problem, in a first aspect, the present application provides a turbulence field update method, including:

obtaining sample turbulence data;

performing model training by use of the sample turbulence data to obtain a reinforcement learning turbulence model;

calculating initial turbulence data of the turbulence field by use of a RANS equation;

processing the initial turbulence data by use of the reinforcement learning turbulence model to obtain a predicted Reynolds stress;

calculating the predicted Reynolds stress by use of the RANS equation to obtain updated turbulence data.

In some embodiments, before the performing model training by use of the sample turbulence data to obtain a reinforcement learning turbulence model, the method further includes:

preprocessing the sample turbulence data to obtain standard sample turbulence data.

In some embodiments, the preprocessing the sample turbulence data to obtain standard sample turbulence data includes:

normalizing the sample turbulence data to obtain normalized sample turbulence data;

extracting the normalized sample turbulence data at equal intervals to obtain the standard sample turbulence data.

In some embodiments, the performing model training by use of the sample turbulence data to obtain a reinforcement learning turbulence model includes:

performing feature extraction on the sample turbulence data to obtain a sample turbulence feature;

performing model training by use of the sample turbulence feature to obtain the reinforcement learning turbulence model.

In some embodiments, the performing model training by use of the sample turbulence feature to obtain the reinforcement learning turbulence model includes:

constructing a Deep-Q-Network (DQN);

performing iterative training on the DQN by use of the sample turbulence feature with a preset target function as an iteration condition to obtain the reinforcement learning turbulence model.

In some embodiments, the calculating initial turbulence data of the turbulence field by use of a RANS equation includes:

obtaining an initial Reynolds stress of the turbulence field;

closing a Reynolds stress item of the RANS equation by use of the initial Reynolds stress to calculate the initial turbulence data.

In some embodiments, the processing the initial turbulence data by use of the reinforcement learning turbulence model to obtain a predicted Reynolds stress includes:

obtaining a learning experience and network parameter during training of the reinforcement learning turbulence model;

optimizing the reinforcement learning turbulence model by use of the learning experience and the network parameter to obtain an optimized reinforcement learning turbulence model;

processing the initial turbulence data by use of the optimized reinforcement learning turbulence model to obtain the predicted Reynolds stress.

In a second aspect, the present application also provides a turbulence field update apparatus, including:

a sample obtaining module, configured to obtain sample turbulence data;

a model training module, configured to perform model training by use of the sample turbulence data to obtain a reinforcement learning turbulence model;

an initial data calculating module, configured to obtain initial turbulence data of the turbulence field through calculating by use of a RANS equation;

an initial data processing module, configured to process the initial turbulence data by use of the reinforcement learning turbulence model to obtain a predicted Reynolds stress;

a turbulence field update module, configured to calculate the predicted Reynolds stress by use of the RANS equation to obtain updated turbulence data.

In a third aspect, the present application also discloses a turbulence field update device, including:

a memory, configured to store a computer program;

a processor, configured to execute the computer program to implement any steps of the turbulence field update method as described above.

In a fourth aspect, the present application also discloses a computer-readable storage medium, having a computer program stored thereon which, when executed by a processor, implements any steps of the turbulence field update method as described above.

The turbulence field update method provided in the present application includes: obtaining sample turbulence data; performing model training by use of the sample turbulence data to obtain a reinforcement learning turbulence model; calculating initial turbulence data of the turbulence field by use of a RANS equation; processing the initial turbulence data by use of the reinforcement learning turbulence model to obtain a predicted Reynolds stress; calculating the predicted Reynolds stress by use of the RANS equation to obtain updated turbulence data.

It can be seen that, according to the turbulence field update method provided in the present application, based on the capabilities of reinforcement learning of generalization, no label, sequential decision-making, and closed-loop update, a turbulence model is constructed by use of the reinforcement learning technology, and a RANS equation solver is coupled with the reinforcement learning turbulence model to obtain a model with a higher generalization ability by training with current turbulence field data, thereby implementing turbulence field update. It can be seen that reinforcement learning technology-based model construction effectively reduces the influence of a difference between a target high-Reynolds-number turbulence and low-Reynolds-number training data and improves the generalization ability of the model. A RANS equation is alternately solved to calculate a turbulence field, and a Reynolds stress is predicted by use of the reinforcement learning turbulence model, whereby difficulties in calculating a high-Reynolds-number turbulence field are reduced effectively, high-accuracy fast solution is implemented, and furthermore, more accurate turbulence field update is implemented.

All of the turbulence field update apparatus and device and computer-readable storage medium provided in the present application have the foregoing beneficial effects. Elaborations are omitted herein.

BRIEF DESCRIPTION OF THE DRAWINGS

In order to describe the technical solutions in the prior art and embodiments of the present application more clearly, the drawings required to be used in descriptions about the prior art and the embodiments of the present application will be introduced briefly below. Certainly, the following drawings about the embodiments of the present application only describe part of embodiments of the present application, those ordinarily skilled in the art may also obtain other drawings according to the provided drawings without creative work, and the obtained other drawings shall also fall within the scope of protection of the present application.

DETAILED DESCRIPTION

A core of the present application is to provide a turbulence field update method. According to the turbulence field update method, the calculation accuracy may be improved effectively, thereby achieving more accurate turbulence field update. Another core of the present application is to provide a turbulence field update apparatus and device, and a computer-readable storage medium, which also have the abovementioned beneficial effect.

In order to describe the technical solutions in the embodiments of the present application more clearly and completely, the technical solutions in the embodiments of the present application will be introduced below in combination with the drawings in the embodiments of the present application. Clearly, the described embodiments are not all embodiments but only part of embodiments of the present application. Based on the embodiments of the present application, all other embodiments obtained by those skilled in the art without creative work shall fall within the protection scope of the present application.

Figure 1:
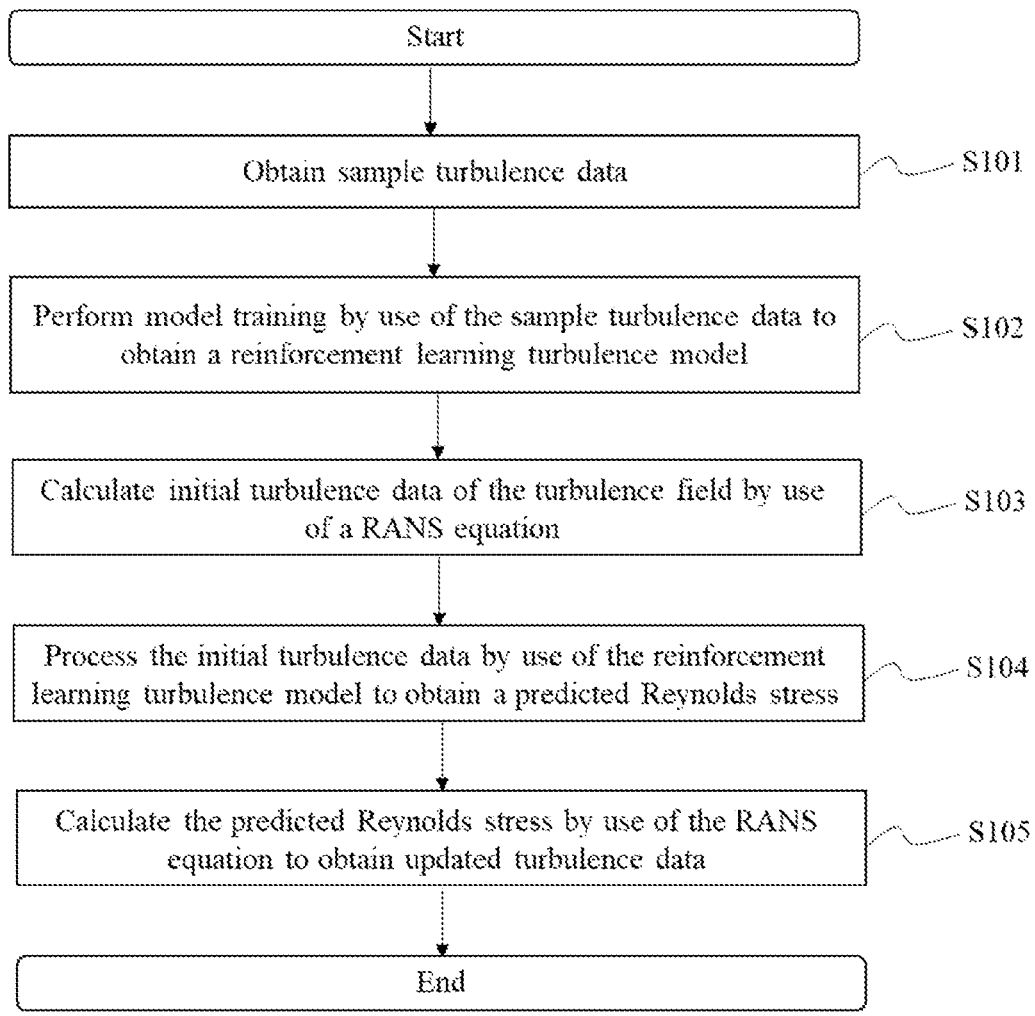
FIG. 1 is a schematic flowchart of a turbulence field update method according to the present application.

Referring to FIG. 1, FIG. 1 is a schematic flowchart of a turbulence field update method according to the present application, including the following steps.

S101: obtain sample turbulence data.

This step aims to obtain sample turbulence data. The sample turbulence data is the disclosed high-accuracy and high-resolution Direct Numerical Simulation (DNS) flow field data available for subsequent model training.

S102: perform model training by use of the sample turbulence data to obtain a reinforcement learning turbulence model.

This step aims to implement model training so as to obtain a reinforcement learning turbulence model. Specifically, a reinforcement learning technology has relatively high capabilities of generalization, no label, sequential decision-making, and closed-loop update, so processing the sample turbulence data based on the reinforcement learning technology to construct the reinforcement learning turbulence model may effectively reduce the influence of a difference between a target high-Reynolds-number turbulence and low-Reynolds-number training data and improve the generalization ability of the model.

In another embodiment, before the step that model training is performed by use of the sample turbulence data to obtain a reinforcement learning turbulence model, the method may further include: preprocessing the sample turbulence data to obtain standard sample turbulence data.

In order to effectively improve the model accuracy, before model training, the sample turbulence data may also be preprocessed to obtain standard sample turbulence data. The preprocessing operation is implemented by many methods, such as standardization processing, normalization processing, and sampling processing. No limits are made thereto in the present application.

In another embodiment, the step of preprocessing the sample turbulence data to obtain standard sample turbulence data may include: normalizing the sample turbulence data to obtain normalized sample turbulence data; extracting the normalized sample turbulence data at equal intervals to obtain the standard sample turbulence data.

This preferred embodiment provides a relatively specific method for preprocessing the sample turbulence data, i.e., data normalization processing and data extraction processing. First, the sample turbulence data is normalized by use of a main flow velocity and density of flat-plate turbulence. Further, normalized sample turbulence data is extracted at an equal interval in three directions of a sample turbulence data space, thereby obtaining the standard sample turbulence data.

In another embodiment, the step of performing model training by use of the sample turbulence data to obtain a reinforcement learning turbulence model may include: performing feature extraction on the sample turbulence data to obtain a sample turbulence feature; performing model training by use of the sample turbulence feature to obtain the reinforcement learning turbulence model.

This preferred embodiment provides a relatively specific model training method, i.e., sample-feature-based model construction. First, a turbulence field feature of the preprocessed sample turbulence data is extracted. Further, model construction is performed by use of the sample turbulence feature, thereby obtaining the reinforcement learning turbulence model. The feature extraction operation may be any one of the prior art. No limits are made thereto in the present application.

In another embodiment, the step that model training is performed by use of the sample turbulence feature to obtain the reinforcement learning turbulence model may include: constructing a DQN; performing iterative training on the DQN by use of the sample turbulence feature with a preset target function as an iteration condition to obtain the reinforcement learning turbulence model.

This preferred embodiment provides a reinforcement learning turbulence model of a specific type, i.e., a DQN-based training model. Specifically, a DQN is constructed, and the sample turbulence feature is input for reinforcement-learning-based iterative training. During iteration, a target function is pre-established as an iteration condition to ensure model convergence, thereby obtaining an accurate reinforcement learning turbulence model.

S103: calculate initial turbulence data of the turbulence field by use of a RANS equation.

This step aims to calculate initial turbulence data, namely calculating based on a RANS equation. The RANS equation is an evolved ensemble averaged Navier-Stokes (N-S) equation describing turbulence statistics.

In another embodiment, the step of calculating initial turbulence data of the turbulence field by use of a RANS equation may include: obtaining an initial Reynolds stress of the turbulence field; closing a Reynolds stress item of the RANS equation by use of the initial Reynolds stress to calculate the initial turbulence data.

This preferred embodiment provides a relatively specific method for calculating the initial turbulence data. First, an initial Reynolds stress of the turbulence field is obtained. The initial Reynolds stress is a Reynolds stress value preset in the current turbulence field. Further, a Reynolds stress item of the RANS equation is closed for solving by use of this value, thereby obtaining the initial turbulence data.

S104: process the initial turbulence data by use of the reinforcement learning turbulence model to obtain a predicted Reynolds stress.

S105: calculate the predicted Reynolds stress by use of the RANS equation to obtain updated turbulence data.

Specifically, the initial turbulence data may be input to the reinforcement learning model for processing, thereby predictively obtaining a Reynolds stress corresponding to an updated turbulence field, i.e., the predicted Reynolds stress. Then, the turbulence field may be updated according to the predicted Reynolds stress. Further, a turbulence field update process may also be implemented based on the RANS equation. Specifically, a Reynolds stress item of the RANS equation may be closed for solving by use of the predicted Reynolds stress, thereby obtaining the updated turbulence data. The updated turbulence data is data information corresponding to the updated turbulence field. Hereto, turbulence field update is completed.

In another embodiment, the step of processing the initial turbulence data by use of the reinforcement learning turbulence model to obtain a predicted Reynolds stress may include: obtaining a learning experience and network parameter during training of the reinforcement learning turbulence model; optimizing the reinforcement learning turbulence model by use of the learning experience and the network parameter to obtain an optimized reinforcement learning turbulence model; processing the initial turbulence data by use of the optimized reinforcement learning turbulence model to obtain the predicted Reynolds stress.

In order to further ensure the accuracy of the predicted Reynolds stress value, before processing the initial turbulence data by use of the reinforcement learning turbulence model, the model may be optimized first by use of data information recorded during training of the reinforcement learning turbulence model. The data information may include a learning experience and a network parameter, is generated and recorded in a memory during model training, and may be directly called. The network parameter may be a weight, an offset, etc. Then, the initial turbulence data may be processed by use of the optimized reinforcement learning turbulence model to obtain the predicted Reynolds stress.

It is to be noted that S101 to S102 present a training process of the reinforcement learning turbulence model. After model training is completed, the model is stored in a pre-created memory space. Further, during practical turbulence field update, the model training process needs to be executed only once, and when subsequently needing to be used for many times, the model may be directly called from the memory space without repeated training.

It can be seen that, according to the turbulence field update method provided in the present application, based on the capabilities of reinforcement learning of generalization, no label, sequential decision-making, and closed-loop update, a turbulence model is constructed by use of the reinforcement learning technology, and a RANS equation solver is coupled with the reinforcement learning turbulence model to obtain a model with a higher generalization ability by training with current turbulence field data, thereby implementing turbulence field update. It can be seen that reinforcement learning technology-based model construction effectively reduces the influence of a difference between a target high-Reynolds-number turbulence and low-Reynolds-number training data and improves the generalization ability of the model. A RANS equation is alternately solved to calculate a turbulence field, and a Reynolds stress is predicted by use of the reinforcement learning turbulence model, whereby difficulties in calculating a high-Reynoldsnumber turbulence field are reduced effectively, high-accuracy fast solution is implemented, and furthermore, more accurate turbulence field update is implemented.

Figure 2:
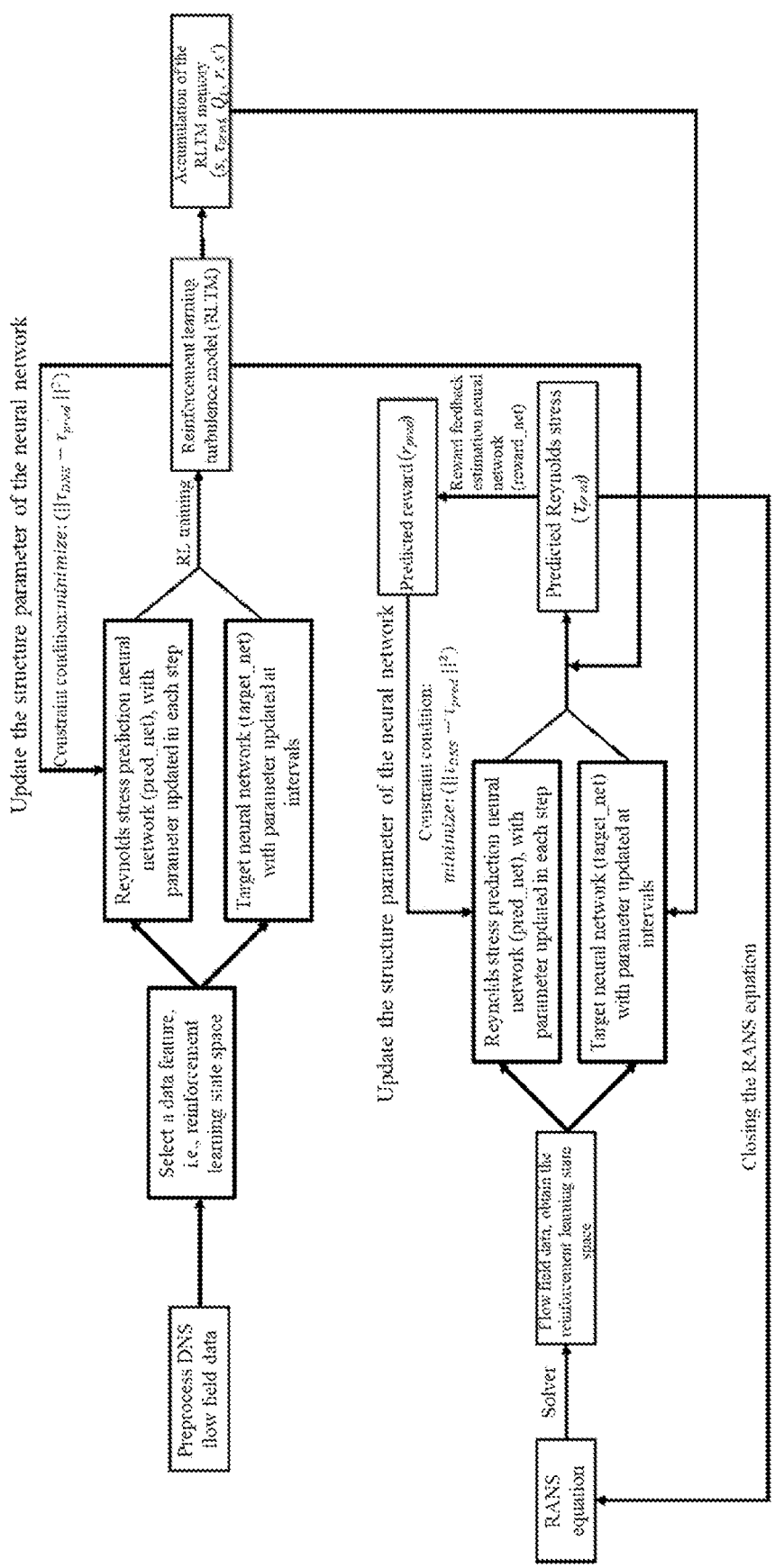
FIG. 2 is a schematic flowchart of another turbulence field update method according to the present application.

Based on each of the above-mentioned embodiments, an embodiment of the present application provides a more specific turbulence field update method. Referring to FIG. 2, FIG. 2 is a schematic flowchart of another turbulence field update method according to the present application.

Specifically, according to the turbulence field update method provided in the present application, a deep reinforcement learning algorithm DQN is coupled with a RANS equation solver, six components (three normal stress components and three tangential stress components) of a Reynolds stress z in a RANS equation are predicted by use of turbulence field data (including velocity components u, v, and w and pressure p in x, y, and z directions), and then the RANS equation is closed by use of the Reynolds stress for next-step turbulence field solving, thereby implementing turbulence field update. Based on this, a specific implementation process of the turbulence field update method is as follows.

1: Training of a Reinforcement Learning Turbulence Model (Regularized Lifelong Topic Model (RLTM))

Currently, a large amount of high-accuracy and high-resolution DNS flow field data has been disclosed for researchers to use. Such data is usually stored at a certain time interval, and includes velocity data u, v, and w and pressure data p of a three-dimensional flow field in the x, y, and z directions. Therefore, a deep neural network model available for predicting a Reynolds stress of a flow field may be trained based on such data.

(1) Preparation and Preprocessing of Existing DNS Flow Field Data

Generally, the flow field velocity and pressure data has been normalized in DNS calculation by use of a feature velocity U and a fluid density ρ. If not, the data may be normalized by use of a main flow velocity U and density ρ of a flat-plate turbulence. Further, considering that a resolution used by DNS is far higher than a computational grid of a RANS equation, in order to match two sets of computational grids and simultaneously reduce the training cost, original DNS data may be extracted at an equal interval in the three spatial directions to form new sparse three-dimensional flow field data sequenced by time for training.

(2) Turbulence Field Feature (Reinforcement Learning State) Selection

Velocity components u, v, and w and pressure p at each computational grid point are selected as a feature, as well as state s in the reinforcement learning algorithm. Further, the states s at all grid points form environment E.

(3) Training of the Reinforcement Learning Turbulence Model (RLTM) and Accumulation of a Memory Typical reinforcement learning parameter spaces may form a quad <A, S, R, T>, i.e., an action space A, a state space S, a reward space R, and a transition function space T. An agent in the environment observes the environment and its own current state s, and performs an action a according to a certain rule or strategy π, thereby obtaining a current reward r and a long-term accumulated reward R, causing a change or transition T of the environment. In a new environment, a new action a1 is performed according to an observed new state s1, thereby obtaining a new reward r1 and accumulated reward R1. Afterwards, this process is repeated.

Specifically, two neural networks that are the same in structure but different in parameter may be constructed by use of a classical DQN method, i.e., a target network (target_net) whose parameter is updated at a certain time interval and a prediction network (pred_net) whose parameter is updated in each step respectively. The prediction network whose parameter is updated in each step is a Reynolds stress prediction neural network for predicting the six components of the Reynolds stress τ. Then, the Reynolds stress prediction neural network may be trained by use of existing high-accuracy and high-resolution DNS data. A learning experience $(s_t, a_t, q_t, r_t, s_{t+1})$ in this process is stored in a memory so as to be randomly extracted for reproduction in a coupled solving process of the reinforcement learning turbulence model (RLTM) and the RANS equation, to assist in predicting the Reynolds stress $\tau_{pred}$. Meanwhile, the parameter of the Reynolds stress prediction neural network, i.e., a weight w and an offset b, is stored so as to provide a set of relatively good initial neural network parameters for subsequent coupled calculation. Based on this, the implementation process is as follows:

Input information about the state s (velocity components u, v, and w and the pressure p), with a first layer (input layer) of the Reynolds stress prediction neural network using a Rectified Linear Unit (ReLu) function as an activation function, a second layer (output layer) not using any activation function, and obtain all predicted values $Q_{pred}$ (related to the reward r). The target network is of the same network structure, outputs all intermediate target values Q', and is configured to calculate and update a target value $Q_{target}$. In calculation, a discount factor γ indicates that the deeper into the future, the less the impact on the current reward, and is valued to a constant between 0 and 1. A specific form of the network is as follows:

$L1 = \text{relu}(w1*S+b1)$ $Q = w2*L1+b2$ where w1 and w2 as well as b1 and b2 represent network parameters of the first layer and the second layer respectively, i.e., weights and offsets, L1 represents an output of the first layer, and value Q is a final output.

Specific forms of $Q_{target}$ and $Q_{pred}$ are as follows:

$Q_{target} = r_{t=1} + \gamma * \max_{a_{t+1}} Q'(s_{t+1}+a_{t=1})$ $Q_{pred} = Q(s_{t+1}+a_{t=1})$ where $s_{t+1}, a_{t+1}, r_{t+1}$ represent a state, action, and reward at a next moment respectively.

Further, after all $Q_{pred}$ are obtained, the action a corresponding to the maximum Qpred is selected, i.e., a current predicted Reynolds stress value $\tau_{pred}$ and an obtained reward r. The reward r is defined as follows:

$$r = \begin{cases} 0, & |\tau_{pred} - \tau_{DNS}| < 10\% \\ |\tau_{pred} - \tau_{DNS}|, & |\tau_{pred} - \tau_{DNS}| > 10\% \end{cases}$$

where $\tau_{DNS}$ represents a known Reynolds stress of the high-accuracy and high-resolution DNS data, and $\tau_{pred}$ represents the current predicted Reynolds stress value.

Hereto, a round of training of the reinforcement learning turbulence model (RLTM) is ended.

(4) Update of the Parameter of the Reynolds Stress Prediction Neural Network

For the Reynolds stress prediction neural network, a loss may be calculated by use of $Q_{target}$ and $Q_{pred}$, and the network parameter may be updated by a back propagation operation. Specifically, a target function for back propagation and parameter updating of the Reynolds stress prediction neural network is defined as minimize: $(\tau_{DNS}-\tau_{pred}^2)$ the network model is corrected and trained by $\tau_{DNS}$, and the weight w and the offset b are updated by a Root Mean Square Propagation (RMSProp) optimizer. In each round of calculation, the network parameter and the learning experience (s, $\tau_{pred}$, Q'$_r$, r, s') are recorded and stored in the memory.

2: Coupled Calculation of the Reinforcement Learning Turbulence Model (RLTM) and the RANS Equation (1) Calculation of an Initial Flow Field Based on the RANS Equation For a turbulence problem to be specifically solved, a Reynolds stress item of the RANS equation is closed by use of a preset initial Reynolds stress $\tau_0$, such as all-zero distribution, thereby obtaining an initial flow field u, v, w, p.

Under a Cartesian coordinate system, the incompressible RANS equation is as follows:

$$\frac{\partial \overline{u_i}}{\partial x_i} = 0$$

$$\frac{\partial \overline{u_i}}{\partial t} + \frac{\partial \overline{u_i u_j}}{\partial x_j} = -\frac{1}{\rho}\frac{\partial \overline{p}}{\partial x_i} + \frac{\partial \sigma_{ij}}{\partial x_j} + \frac{\partial(-\overline{u'_i u'_j})}{\partial x_j}$$

The first formula is a continuity equation, reflecting the incompressibility of a fluid. The second formula is a momentum equation whose essence is the Newton's second law, reflecting a stress condition of a fluid element. u and p represent a velocity and pressure of the fluid respectively, and ρ represents a density. $\overline{\ast}$ represents a Reynolds averaged physical quantity. The subscripts i and j represent components of the physical quantity in different directions x, y, and z. The superscript ' represents a pulsating quantity after an average value is subtracted, reflecting the high pulsatility of the turbulence. $\sigma^{ij}$ represents a stress tensor consisting of spatial partial derivatives of the average velocity component $\overline{u_i}$ with respect to x, y, and z, reflecting stress (or tensile) and shear situations of the fluid. $-\overline{u'_i u'_j}$ represents an additional Reynolds stress tensor caused by a Reynolds averaging operation, i.e., τ, and needs to be closed.

(2) Prediction of the Reynolds Stress with the Reinforcement Learning Turbulence Model (RLTM)

After being obtained by solving the RANS equation, the initial flow field data may be input to the reinforcement learning turbulence model (RLTM) as the state s. The predicted Reynolds stress $\tau_{pred}$ is calculated by alternately using the Reynolds stress prediction neural network and target neural network of the same structure as that during model training.

Specifically, main steps of this process are similar to those of a training link of the reinforcement learning turbulence model. However, τDNS of the high-accuracy and high-resolution data is not obtained in advance in calculation for the specific turbulence problem, so the target function for back propagation and parameter updating of the Reynolds stress prediction neural network needs to be changed to minimize: $(\tau_{DNS}-\tau_{pred}^2)$. Where r represents a practical reward obtained by predicting $\tau_{pred}$, and $r_{pred}$ represents a predicted reward calculated by an additional two-layer reward feedback estimation neural network (reward_net) whose first layer uses ReLu as an excitation function. A specific form of the network is as follows:

$L1=\text{relu}(w2*\tau_{pred}+b^2)$ $r_{pred}=w1*L1+b1$

It is particularly noted that the network structure parameter stored in the model training link may be assigned to the prediction neural network as an initial value so as to improve the performance of the initial network, and the parameter of the target neural network is reproduced and periodically fixed by means of specific experiences in the DQN algorithm. Every time when the DQN algorithm is updated, some experiences cc in the training stage may be randomly extracted from the memory for learning. For example, when Qtarget is calculated by use of the target neural network, Q' used in $Q_{target}=r_{t+1}+\gamma*\max_{a_{t+1}}Q'(s_{t+1}, a_{t+1})$ is a parameter extracted from the memory. Random extraction may effectively break the correlation between physical quantities of the turbulence developed in the time direction and effectively ensure the efficiency of the neural network. In addition, during calculation, the structure parameter of the target neural network remains unchanged in a period of time, and then is updated by the Reynolds stress prediction neural network whose parameter remains latest anytime, whereby the correlation between the two networks is effectively broken.

(3) Calculation with the RANS Equation for Flow Field Update

The Reynolds stress item of the RANS equation is closed based on the predicted Reynolds stress $\tau_{pred}$ to obtain updated flow field information (u, v, w, p) as the state s1 the next step. A predicted Reynolds stress in the next step is predicted by use of the reinforcement learning turbulence model. The operations are cyclically performed to implement turbulence field update.

It can be seen that, according to the turbulence field update method provided in the embodiment of the present application, based on the capabilities of reinforcement learning of generalization, no label, sequential decision-making, and closed-loop update, a turbulence model is constructed by use of the reinforcement learning technology, and a RANS equation solver is coupled with the reinforcement learning turbulence model to obtain a model with a higher generalization ability by training with current turbulence field data, thereby implementing turbulence field update. It can be seen that reinforcement learning technology-based model construction effectively reduces the influence of a difference between a target high-Reynolds-number turbulence and low-Reynolds-number training data and improves the generalization ability of the model. A RANS equation is alternately solved to calculate a turbulence field, and a Reynolds stress is predicted by use of the reinforcement learning turbulence model, whereby difficulties in calculating a high-Reynolds-number turbulence field are reduced effectively, high-accuracy fast solution is implemented, and furthermore, more accurate turbulence field update is implemented.

Figure 3:
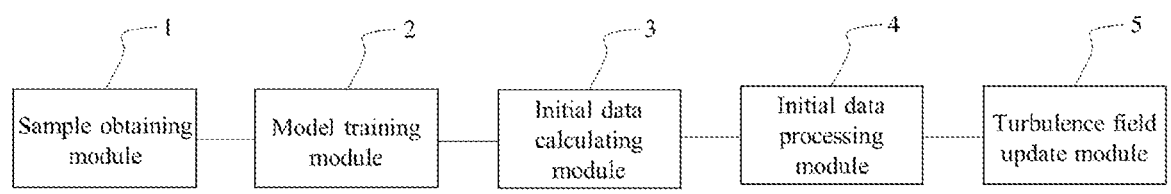
FIG. 3 is a schematic structural diagram of a turbulence field update apparatus according to the present application.

In order to solve the foregoing technical problem, the present application also provides a turbulence field update apparatus. Referring to FIG. 3, FIG. 3 is a schematic structural diagram of a turbulence field update apparatus according to the present application, including:

a sample obtaining module 1, configured to obtain sample turbulence data;

a model training module 2, configured to perform model training by use of the sample turbulence data to obtain a reinforcement learning turbulence model;

an initial data calculating module 3, configured to obtain initial turbulence data of the turbulence field through calculating by use of a RANS equation;

an initial data processing module 4, configured to process the initial turbulence data by use of the reinforcement learning turbulence model to obtain a predicted Reynolds stress;

a turbulence field update module 5, configured to calculate the predicted Reynolds stress by use of the RANS equation to obtain updated turbulence data.

It can be seen that, according to the turbulence field update apparatus provided in the embodiment of the present application, based on the capabilities of reinforcement learning of generalization, no label, sequential decision-making, and closed-loop update, a turbulence model is constructed by use of the reinforcement learning technology, and a RANS equation solver is coupled with the reinforcement learning turbulence model to obtain a model with a higher generalization ability by training with current turbulence field data, thereby implementing turbulence field update. It can be seen that reinforcement learning technology-based model construction effectively reduces the influence of a difference between a target high-Reynolds-number turbulence and low-Reynolds-number training data and improves the generalization ability of the model. A RANS equation is alternately solved to calculate a turbulence field, and a Reynolds stress is predicted by use of the reinforcement learning turbulence model, whereby difficulties in calculating a high-Reynolds-number turbulence field are reduced effectively, high-accuracy fast solution is implemented, and furthermore, more accurate turbulence field update is implemented.

In another embodiment, the turbulence field update apparatus may further include a data preprocessing module, configured to preprocess the sample turbulence data to obtain standard sample turbulence data.

In another embodiment, the data preprocessing module may include:

a normalization unit, configured to normalize the sample turbulence data to obtain normalized sample turbulence data;

a data extraction unit, configured to extract the normalized sample turbulence data at an equal interval to obtain the standard sample turbulence data.

In another embodiment, the model training module 2 may include:

a feature extraction unit, configured to perform feature extraction on the sample turbulence data to obtain a sample turbulence feature;

a model training unit, configured to perform model training by use of the sample turbulence feature to obtain the reinforcement learning turbulence model.

In another embodiment, the model training unit may specifically be configured to construct a DQN, and perform iterative training on the DQN by use of the sample turbulence feature by taking a preset target function as an iteration condition to obtain the reinforcement learning turbulence model.

In another embodiment, the initial data calculating module 3 may specifically be configured to obtain an initial Reynolds stress of the turbulence field, and close a Reynolds stress item of the RANS equation by use of the initial Reynolds stress to calculate the initial turbulence data.

In another embodiment, the turbulence field update module 5 may specifically be configured to obtain a learning experience and network parameter during training of the reinforcement learning turbulence model, optimize the reinforcement learning turbulence model by use of the learning experience and the network parameter to obtain an optimized reinforcement learning turbulence model, and process the initial turbulence data by use of the optimized reinforcement learning turbulence model to obtain the predicted Reynolds stress.

Introductions about the apparatus provided in the present application refer to the method embodiment, and elaborations are omitted in the present application.

Figure 4:
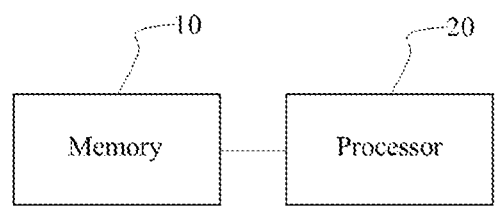
FIG. 4 is a schematic structural diagram of a turbulence field update device according to the present application.

In order to solve the foregoing technical problem, the present application also provides a turbulence field update device. Referring to FIG. 4, FIG. 4 is a schematic structural diagram of a turbulence field update device according to the present application. The turbulence field update device may include:

a memory 10, configured to store a computer program;

a processor 20, configured to execute the computer program to implement any steps of the turbulence field update method as described above.

Introductions about the device provided in the present application refer to the method embodiment, and elaborations are omitted in the present application.

In order to solve the foregoing problem, the present application also provides a computer-readable storage medium, storing a computer program that may be executed by a processor to implement any steps of the turbulence field update method as described above.

The computer-readable storage medium may include various media capable of storing program codes, such as a U disk, a mobile hard disk, a Read-Only Memory (ROM), a Random Access Memory (RAM), a magnetic disk, or an optical disk.

Introductions about the computer-readable storage medium provided in the present application refer to the method embodiment, and elaborations are omitted in the present application.

All the embodiments in this specification are described in a progressive manner. Contents mainly described in each embodiment are different from those described in other embodiments. Same or similar parts of all the embodiments refer to each other. For the apparatus disclosed in the embodiments, since it corresponds to the method disclosed in the embodiments, the description is relatively simple, and the relevant part can be referred to the description of the method part.

The skilled person may further realize that the units and algorithmic steps of each example described in conjunction with the embodiments disclosed herein are capable of being implemented in electronic hardware, computer software, or a combination of both, and that the composition and steps of each example have been described generally by function in the above description for the purpose of clearly illustrating the interchangeability of hardware and software. Whether these functions are performed in hardware or software depends on the particular application and design constraints of the technical solution. The skilled person may use different methods to implement the described functions for each particular application, but such implementation should not be considered as going beyond the scope of the present application.

The steps of a method or algorithm described in conjunction with the embodiments disclosed herein may be directly implemented in hardware, a software module executed by a processor, or a combination of the hardware and the software module. The software module can be placed in a random access memory (RAM), an internal memory, a read only memory (ROM), an electrically programmable ROM, an electrically erasable programmable ROM, a register, a hard disk, a mobile disk, a CD-ROM, or any storage medium in other forms known to the technical field.

The technical solutions provided in the present application are introduced above in detail. Specific examples are applied in this specification to illustrate the principle and embodiments of the present application, and the above description of the embodiments is only used to help understand the method of the present application and the core idea thereof. It should be noted that for a person of ordinary skill in the art, several improvements and modifications can be made to the present application without departing from the principle of the present application, and these improvements and modifications also fall within the scope of protection of the present application.

What is claimed is:

1. A turbulence field update method, comprising:
   obtaining sample turbulence data;
   performing model training by use of the sample turbulence data to obtain a reinforcement learning turbulence model;
   calculating initial turbulence data of the turbulence field by use of a Reynolds Averaged Navier-Stokes (RANS) equation;
   processing the initial turbulence data by use of the reinforcement learning turbulence model to obtain a predicted Reynolds stress; and
   using the predicted Reynolds stress as an input to the RANS equation to obtain updated turbulence data;
   wherein the performing model training by use of the sample turbulence data to obtain a reinforcement learning turbulence model comprises:
      performing feature extraction on the sample turbulence data to obtain a sample turbulence feature; and
      performing model training by use of the sample turbulence feature to obtain the reinforcement learning turbulence model.

2. The turbulence field update method according to claim 1, wherein the performing model training by use of the sample turbulence feature to obtain the reinforcement learning turbulence model comprises:
   constructing a Deep-Q-Network (DQN); and
   performing iterative training on the DON by use of the sample turbulence feature with a preset target function as an iteration condition to obtain the reinforcement learning turbulence model.

3. The turbulence field update method according to claim 1, wherein the calculating initial turbulence data of the turbulence field by use of a RANS equation comprises:
   obtaining an initial Reynolds stress of the turbulence field; and
   closing a Reynolds stress item of the RANS equation by use of the initial Reynolds stress to calculate the initial turbulence data.

4. The turbulence field update method according to claim 1, wherein the processing the initial turbulence data by use of the reinforcement learning turbulence model to obtain a predicted Reynolds stress comprises:
   obtaining a learning experience and network parameter during training of the reinforcement learning turbulence model;
   optimizing the reinforcement learning turbulence model by use of the learning experience and the network parameter to obtain an optimized reinforcement learning turbulence model; and
   processing the initial turbulence data by use of the optimized reinforcement learning turbulence model to obtain the predicted Reynolds stress.

5. A turbulence field update device, comprising:
   a memory, configured to store a computer program;
   a processor, configured to execute the computer program to implement any steps of a turbulence field update method, wherein the turbulence field update method comprises:
   obtaining sample turbulence data;
   performing model training by use of the sample turbulence data to obtain a reinforcement learning turbulence model;
   calculating initial turbulence data of the turbulence field by use of a Reynolds Averaged Navier-Stokes (RANS) equation;
   processing the initial turbulence data by use of the reinforcement learning turbulence model to obtain a predicted Reynolds stress;
   using the predicted Reynolds stress as an input to the RANS equation to obtain updated turbulence data;
   wherein the performing model training by use of the sample turbulence data to obtain a reinforcement learning turbulence model comprises:
      performing feature extraction on the sample turbulence data to obtain a sample turbulence feature; and
      performing model training by use of the sample turbulence feature to obtain the reinforcement learning turbulence model.

6. The turbulence field update device according to claim 5, wherein the performing model training by use of the sample turbulence feature to obtain the reinforcement learning turbulence model comprises:
   constructing a Deep-Q-Network (DQN); and
   performing iterative training on the DQN by use of the sample turbulence feature with a preset target function as an iteration condition to obtain the reinforcement learning turbulence model.

7. The turbulence field update device according to claim 5, wherein the calculating initial turbulence data of the turbulence field by use of a RANS equation comprises:
   obtaining an initial Reynolds stress of the turbulence field; and
   closing a Reynolds stress item of the RANS equation by use of the initial Reynolds stress to calculate the initial turbulence data.

8. The turbulence field update device according to claim 5, wherein the processing the initial turbulence data by use of the reinforcement learning turbulence model to obtain a predicted Reynolds stress comprises:
   obtaining a learning experience and network parameter during training of the reinforcement learning turbulence model;
   optimizing the reinforcement learning turbulence model by use of the learning experience and the network parameter to obtain an optimized reinforcement learning turbulence model; and
   processing the initial turbulence data by use of the optimized reinforcement learning turbulence model to obtain the predicted Reynolds stress.

9. A non-transitory computer-readable storage medium, having a computer program stored thereon which, when executed by a processor, implements any steps of a turbulence field update method, wherein the turbulence field update method comprises:
   obtaining sample turbulence data;
   performing model training by use of the sample turbulence data to obtain a reinforcement learning turbulence model;

calculating initial turbulence data of the turbulence field by use of a Reynolds Averaged Navier-Stokes (RANS) equation;

processing the initial turbulence data by use of the reinforcement learning turbulence model to obtain a predicted Reynolds stress;

using the predicted Reynolds stress as an input to the RANS equation to obtain updated turbulence data;

wherein the performing model training by use of the sample turbulence data to obtain a reinforcement learning turbulence model comprises:

performing feature extraction on the sample turbulence data to obtain a sample turbulence feature; and performing model training by use of the sample turbulence feature to obtain the reinforcement learning turbulence model.

10. The non-transitory computer-readable storage medium according to claim 9, wherein the performing model training by use of the sample turbulence feature to obtain the reinforcement learning turbulence model comprises:

constructing a Deep-Q-Network (DQN); and performing iterative training on the DON by use of the sample turbulence feature with a preset target function as an iteration condition to obtain the reinforcement learning turbulence model.

11. The non-transitory computer-readable storage medium according to claim 9, wherein the calculating initial turbulence data of the turbulence field by use of a RANS equation comprises:

obtaining an initial Reynolds stress of the turbulence field; and closing a Reynolds stress item of the RANS equation by use of the initial Reynolds stress to calculate the initial turbulence data.

12. The turbulence field update method according to claim 1, wherein before the performing model training by use of the sample turbulence data to obtain a reinforcement learning turbulence model, the turbulence field update method further comprises:

preprocessing the sample turbulence data to obtain standard sample turbulence data.

13. The turbulence field update method according to claim 12, wherein the preprocessing the sample turbulence data to obtain standard sample turbulence data comprises:

normalizing the sample turbulence data to obtain normalized sample turbulence data; and extracting the normalized sample turbulence data at equal intervals to obtain the standard sample turbulence data.

14. The turbulence field update device according to claim 5, wherein before the performing model training by use of the sample turbulence data to obtain a reinforcement learning turbulence model, the turbulence field update method further comprises:

preprocessing the sample turbulence data to obtain standard sample turbulence data.

15. The turbulence field update device according to claim 14, wherein the preprocessing the sample turbulence data to obtain standard sample turbulence data comprises:

normalizing the sample turbulence data to obtain normalized sample turbulence data; and extracting the normalized sample turbulence data at equal intervals to obtain the standard sample turbulence data.

16. The non-transitory computer-readable storage medium according to claim 9, wherein before the performing model training by use of the sample turbulence data to obtain a reinforcement learning turbulence model, the turbulence field update method further comprises:

preprocessing the sample turbulence data to obtain standard sample turbulence data.

17. The non-transitory computer-readable storage medium according to claim 16, wherein the preprocessing the sample turbulence data to obtain standard sample turbulence data comprises:

normalizing the sample turbulence data to obtain normalized sample turbulence data; and extracting the normalized sample turbulence data at equal intervals to obtain the standard sample turbulence data.

\* \* \* \* \*